(12) United States Patent
Harloff et al.

(10) Patent No.: US 12,715,579 B1
(45) Date of Patent: Aug. 25, 2026

(54) GIMBAL LOCK SYSTEMS HAVING ROTATABLE HUB LOCKS

(71) Applicant: Textron Innovations Inc., Providence, RI (US)

(72) Inventors: Andrew William Harloff, North Richland Hills, TX (US); Andrew Ryan Maresh, Lewisville, TX (US); Bryan Kenneth Baskin, Arlington, TX (US); Kyle Thomas Cravener, Watauga, TX (US); Marco Antonio Agredano, Corinth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 19/305,240

(22) Filed: Aug. 20, 2025

(51) Int. Cl.
*B64C 29/00* (2006.01)
*B64C 27/52* (2006.01)

(52) U.S. Cl.
CPC .......... *B64C 29/0091* (2013.01); *B64C 27/52* (2013.01); *B64C 29/0033* (2013.01)

(58) Field of Classification Search
CPC ................................ B64C 27/50; B64C 11/28
See application file for complete search history.

(56) References Cited

U.S. PATENT DOCUMENTS 2,861,640 A 11/1958 Du Pont
3,515,500 A 6/1970 Nachod
3,528,630 A 9/1970 Ferris et al.
3,592,412 A 7/1971 Glatfelter
4,073,600 A 2/1978 Doman
6,622,962 B1 9/2003 White
7,037,072 B2 5/2006 Carson
8,998,125 B2 4/2015 Hollimon et al.
9,126,681 B1 9/2015 Judge
10,336,447 B2 * 7/2019 Tzeng ..................... B64C 11/28
10,526,068 B2 1/2020 Schank et al.
10,933,985 B2 * 3/2021 Schank ................. B64C 27/322
10,946,955 B2 * 3/2021 Schank ................. B64C 27/322
11,414,185 B2 * 8/2022 Cravener ................ B64C 11/28
11,511,848 B2 * 11/2022 Cravener ................ B64C 11/28
2016/0083087 A1 3/2016 Schank et al.
2016/0152329 A1 6/2016 Tzeng et al.
2019/0047692 A1 2/2019 Schank et al.

* cited by examiner

*Primary Examiner* — Arfan Y. Sinaki
(74) *Attorney, Agent, or Firm* — Lawrence Youst PLLC

(57) ABSTRACT

A propulsion system for a rotorcraft includes a mast having an axis of rotation. A hub assembly is coupled to and rotatable with the mast. The hub assembly has a gimballing degree of freedom relative to the mast. A gimbal lock system is positioned about and rotatable with the mast. The gimbal lock system includes a hub lock and an actuation assembly that is operably coupled to the hub lock. The hub lock is translatable relative to the mast between a disengaged position with the hub assembly to enable the gimballing degree of freedom and an engaged position with the hub assembly to disable the gimballing degree of freedom. The hub lock is rotatable about the axis of rotation relative to the mast and the actuation assembly.

20 Claims, 16 Drawing Sheets

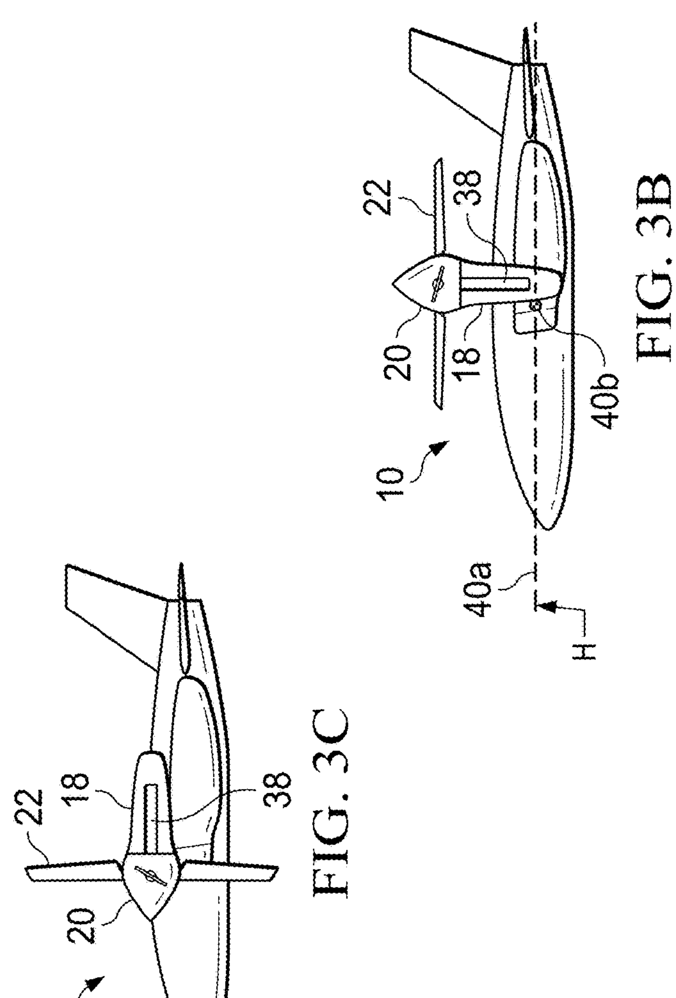
FIG. 3B
FIG. 3C
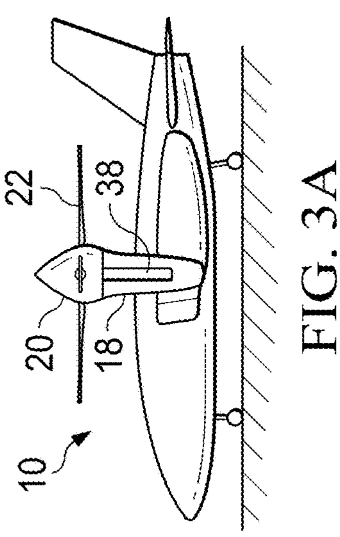
FIG. 3A
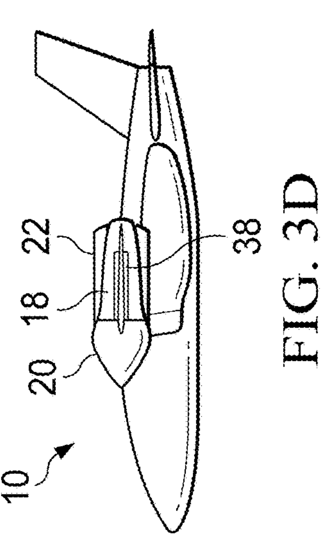
FIG. 3D

GIMBAL LOCK SYSTEMS HAVING ROTATABLE HUB LOCKS

GOVERNMENT RIGHTS

This invention was made with Government support under Agreement No. HR0011-23-9-0148, awarded by DARPA. The Government has certain rights in the invention.

TECHNICAL FIELD OF THE DISCLOSURE

The present disclosure relates, in general, to rotorcraft that have gimballed rotor systems and, in particular, to gimbal lock systems for rotorcraft that have rotatable hub locks configured to selectively enable and disable the gimballing degree of freedom of the gimballed rotor systems.

BACKGROUND

Vertical takeoff and landing (VTOL) aircraft are capable of taking off and landing without a runway. One example of a VTOL aircraft is a helicopter which is a rotorcraft having one or more rotor systems that provide lift and thrust to the aircraft. The rotor systems not only provide vertical takeoff and landing capability, but also enable hovering as well as forward, backward and lateral flight. These attributes make helicopters highly versatile for use in congested, isolated or remote areas. It has been found, however, that helicopters typically lack the forward airspeed of fixed-wing aircraft due to the phenomena of retreating blade stall and the limitations of advancing blade Mach number. Tiltrotor aircraft attempt to overcome this drawback by utilizing proprotor systems that can change their plane of rotation based upon the operation being performed. Tiltrotor aircraft typically have a pair of propulsion systems mounted near the outboard ends of a fixed wing. The propulsion systems are rotatable relative to the fixed wing such that their proprotor systems have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that the maximum airspeed of conventional tiltrotor aircraft in forward flight may be limited due to forward airspeed induced proprotor aeroelastic instability. Accordingly, a need has arisen for improved propulsion systems for tiltrotor aircraft that not only enable vertical takeoff and landing but also support high-speed forward flight.

SUMMARY

In a first aspect, the present disclosure is directed to a propulsion system for a rotorcraft that includes a mast having an axis of rotation. A hub assembly is coupled to and rotatable with the mast. The hub assembly has a gimballing degree of freedom relative to the mast. A gimbal lock system is positioned about and rotatable with the mast. The gimbal lock system includes a hub lock and an actuation assembly that is operably coupled to the hub lock. The hub lock is translatable relative to the mast between a disengaged position with the hub assembly to enable the gimballing degree of freedom and an engaged position with the hub assembly to disable the gimballing degree of freedom. The hub lock is rotatable about the axis of rotation relative to the mast and the actuation assembly.

In certain embodiments, the hub assembly may include a hub lock receptacle that has an inner surface configured to receive the hub lock. In such embodiments, the inner surface of the hub lock receptacle may be a tapering inner surface configured to receive and release the hub lock. In some embodiments, the hub lock may include a leading guide that has a tapering outer surface configured to align the hub lock with the hub lock receptacle. In certain embodiments, the hub lock may include a plurality of radially outwardly extending and circumferentially distributed rollers that are configured to contact the inner surface of the hub lock receptacle to disable the gimballing degree of freedom. In such embodiments, each of the rollers may be housed within a roller cartridge.

In some embodiments, the gimbal lock system may include a revolute joint that is positioned between the hub lock and the actuation assembly with the revolute joint configured to enable relative rotation between the hub lock and the actuation assembly. In such embodiments, the revolute joint may create a low-friction interface between the hub lock and the actuation assembly, for example, the revolute joint may be a bearing assembly such as a ball bearing assembly. In certain embodiments, a mast sleeve may be positioned between the mast and the hub lock. In addition, a low-friction interface may be positioned between the mast sleeve and the hub lock with the low-friction interface configured to enable relative translation and relative rotation between the hub lock and the mast sleeve. In such embodiments, the low-friction interface may be a low-friction liner coupled to an inner surface of the hub lock such as a fluoropolymer liner or a polytetrafluoroethylene liner.

In some embodiments, the actuation assembly may include a lifting ring coupled to the hub lock, an over-center locking mechanism coupled to the lifting ring with the over-center locking mechanism having an open position and a locked position and a motor operably coupled to the over-center locking mechanism and configured to operate the over-center locking mechanism between the open position and the locked position. In certain embodiments, the open position of the over-center locking mechanism may correspond with the disengaged position of the hub lock and the locked position of the over-center locking mechanism may correspond with the engaged position of the hub lock.

In a second aspect, the present disclosure is directed to a tiltrotor aircraft that includes a fuselage, a wing coupled to the fuselage and a pylon assembly tiltably coupled to the wing. A mast is rotatable relative to the pylon assembly about an axis of rotation. A hub assembly is coupled to and rotatable with the mast. The hub assembly has a gimballing degree of freedom relative to the mast. A gimbal lock system is positioned about and rotatable with the mast. The gimbal lock system includes a hub lock and an actuation assembly that is operably coupled to the hub lock. The hub lock is translatable relative to the mast between a disengaged position with the hub assembly to enable the gimballing degree of freedom and an engaged position with the hub assembly to disable the gimballing degree of freedom. The hub lock is rotatable about the axis of rotation relative to the mast and the actuation assembly.

In some embodiments, the tiltrotor aircraft may be operable to transition between a rotary flight mode and a non-rotary flight mode. In such embodiments, the hub lock is in the engaged position in the non-rotary flight mode to stabilize the hub assembly and the hub lock is in the disengaged position in the rotary flight mode to permit flapping of the hub assembly. In certain embodiments, the tiltrotor aircraft may have a vertical takeoff and landing flight mode. In such embodiments, the hub lock is in the disengaged position in the vertical takeoff and landing flight mode to permit flapping of the hub assembly. In some embodiments, the tiltrotor aircraft may be a high-speed vertical takeoff and landing aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3H are schematic illustrations of a high-speed tiltrotor aircraft having a gimbal lock system with a rotatable hub lock configured to selectively enable and disable the gimballing degree of freedom of a proprotor system depicting a sequential flight-operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figures 1A, 1B:
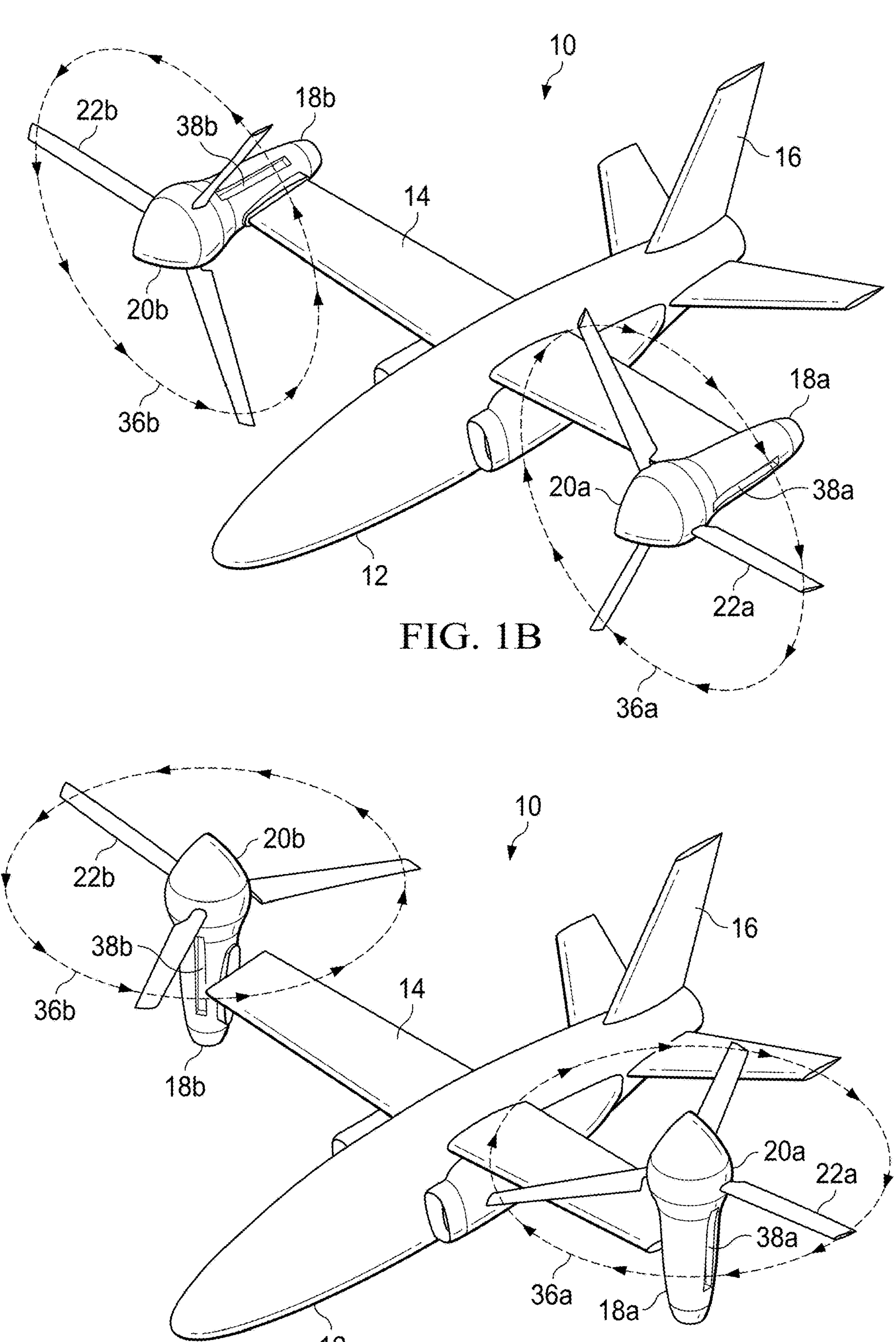
FIGS. 1A-1D are schematic illustrations of a high-speed tiltrotor aircraft having a gimbal lock system with a rotatable hub lock configured to selectively enable and disable the gimballing degree of freedom of a proprotor system in accordance with embodiments of the present disclosure.
Figure 1D:
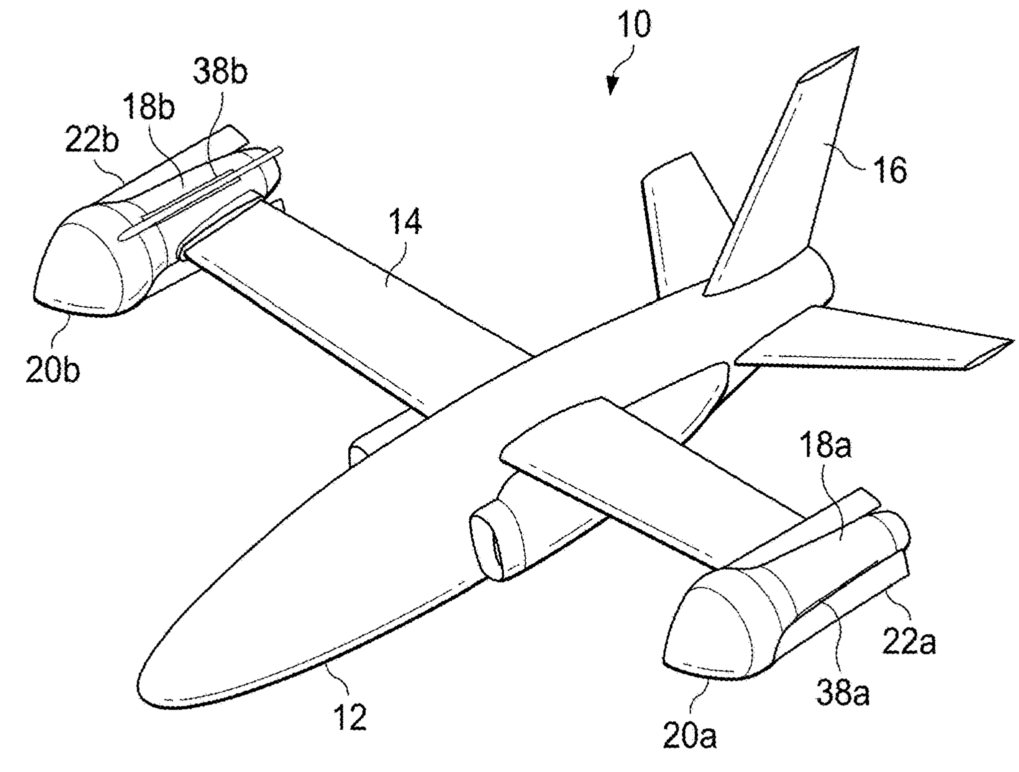
Figure 1C:
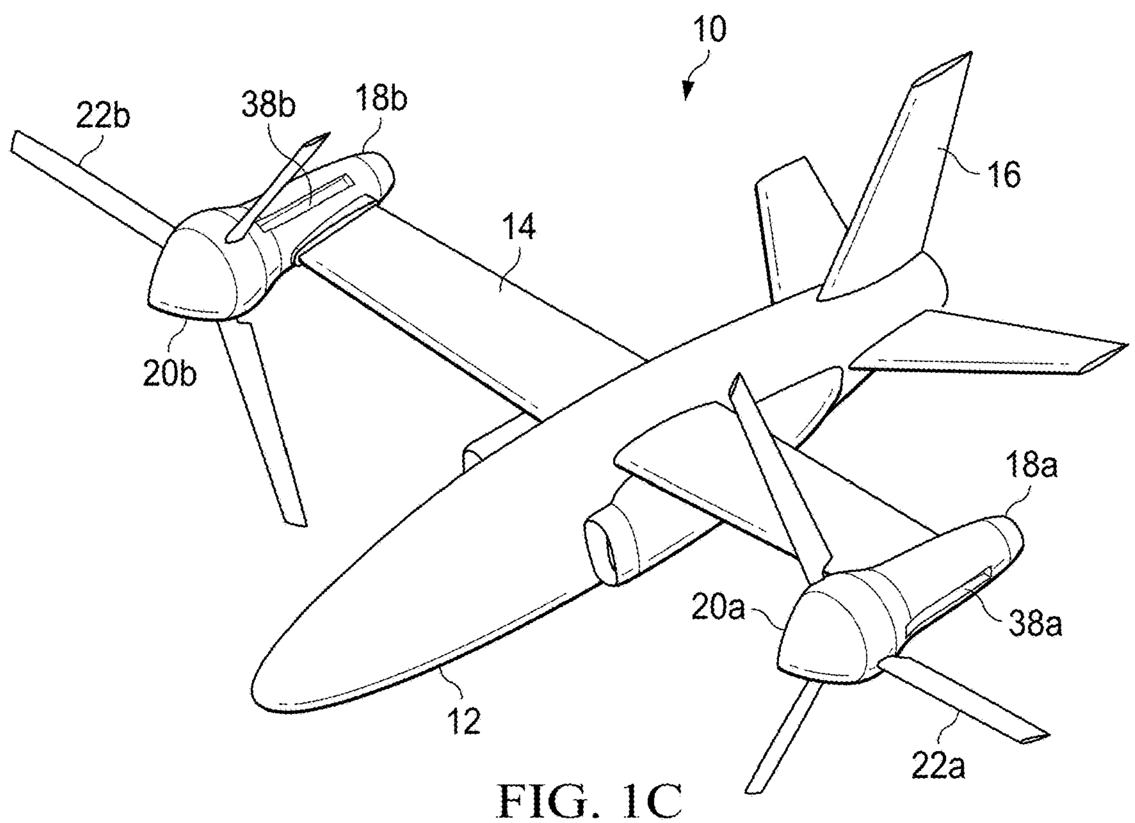

Referring initially to FIGS. 1A-1D in the drawings, an aircraft depicted as a high-speed tiltrotor aircraft is schematically illustrated and generally designated 10. Aircraft 10 may be a manned aircraft operated, for example, by a pilot and a copilot or may be an unmanned aircraft such as an unpiloted aerial vehicle or a remotely piloted aircraft. Aircraft 10 includes a fuselage 12, a wing 14 and a tail assembly 16 depicted as including vertical and horizonal stabilizers that may have moveable control surfaces such as a rudder and elevators that provide stability as well as pitch and yaw control during forward flight. Located proximate the outboard ends of wing 14 are pylon assemblies 18*a*, 18*b* that are rotatable relative to wing 14 between a generally vertical orientation, as best seen in FIG. 1A, and a generally horizontal orientation, as best seen in FIGS. 1B-1D. In the illustrated embodiment, pylon assembly 18*a* houses a portion of the drive system that is used to power gimballed proprotor system 20*a*. Likewise, pylon assembly 18*b* houses a portion of the drive system that is used to power gimballed proprotor system 20*b*.

Each proprotor system 20*a*, 20*b* includes a plurality of proprotor blade assemblies 22*a*, 22*b* that may be configured in a variety of orientations. For example, as best seen in FIG. 1A, proprotor blade assemblies 22*a*, 22*b* are operable to be rotated in a generally horizontal plane for vertical takeoff and landing operations during which the gimballing degree of freedom of proprotor systems 20*a*, 20*b* is enabled. As best seen in FIG. 1B, proprotor blade assemblies 22*a*, 22*b* are operable to be rotated in a generally vertical plane for low to moderate speed forward flight during which the gimballing degree of freedom of proprotor systems 20*a*, 20*b* is enabled. As best seen in FIG. 1C, proprotor blade assemblies 22*a*, 22*b* are operable to be rotationally fixed during transitional forward flight. It is noted that FIG. 1C may represent proprotor systems 20*a*, 20*b* when the gimballing degree of freedom is enabled or when the gimballing degree of freedom is disabled using the gimbal lock systems having rotatable hub locks disclosed herein. As best seen in FIG. 1D, proprotor blade assemblies 22*a*, 22*b* are operable to be folded for high-speed forward flight during which the gimballing degree of freedom of proprotor systems 20*a*, 20*b* is disabled.

Figure 2:
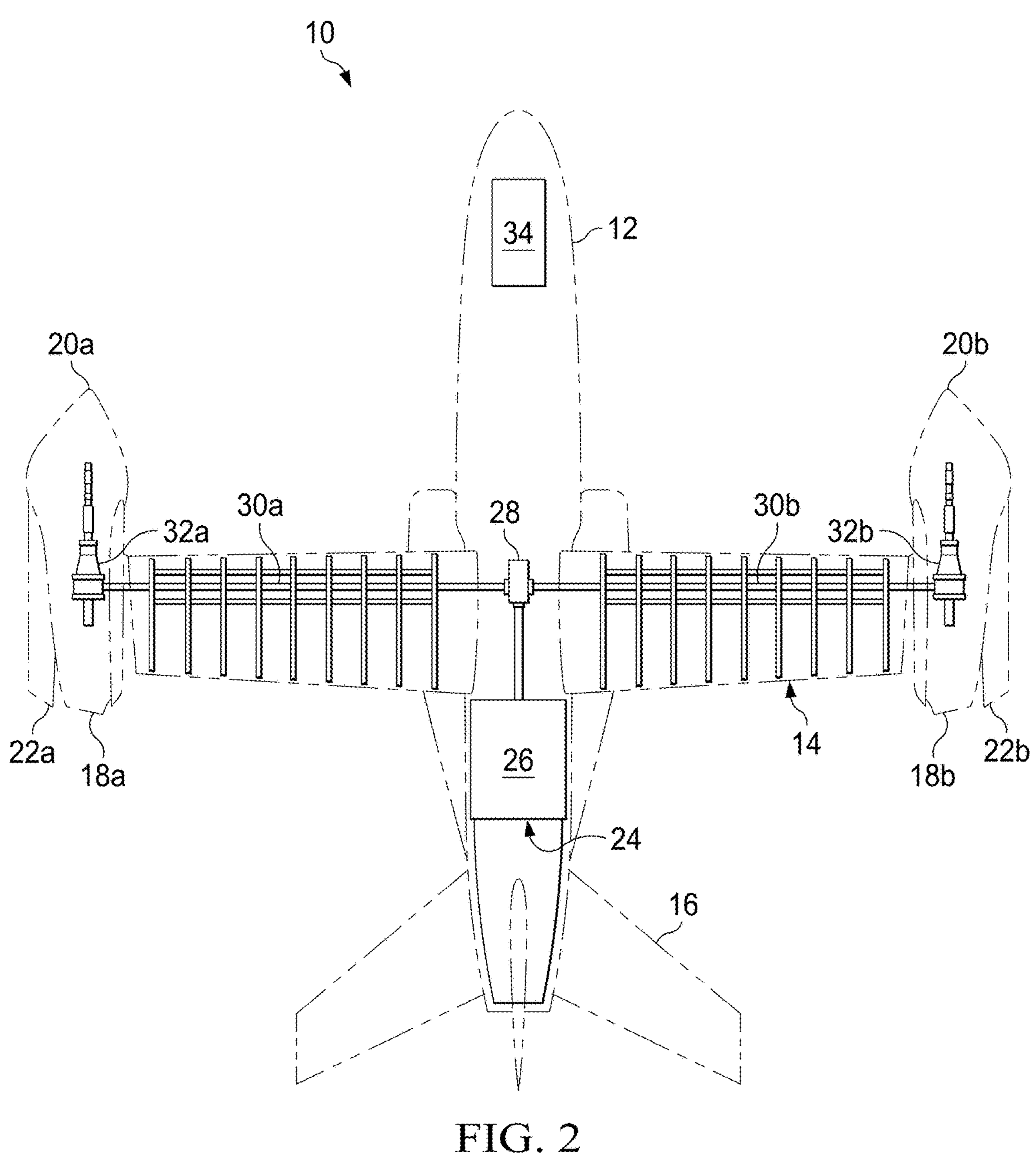
FIG. 2 is a plan view of a high-speed tiltrotor aircraft having a gimbal lock system with a rotatable hub lock configured to selectively enable and disable the gimballing degree of freedom of a proprotor system in accordance with embodiments of the present disclosure.

Referring additionally to FIG. 2 in the drawings, aircraft 10 has a propulsion system 24 that includes an engine 26 located proximate an aft portion of fuselage 12, a main gearbox 28 locate within fuselage 12, driveshafts 30*a*, 30*b* located in wing 14, a proprotor gearbox 32*a* housed within pylon assembly 18*a*, a proprotor gearbox 32*b* housed within pylon assembly 18*b* and gimballed proprotor systems 20*a*, 20*b*. In a rotary flight mode of aircraft 10, engine 26 operates as a turboshaft engine to provide torque and rotational energy to proprotor system 20*a* via main gearbox 28, driveshaft 30*a* and proprotor gearbox 32*a*. Likewise, engine 26 provides torque and rotational energy to proprotor system 20*b* via main gearbox 28, driveshaft 30*b* and proprotor gearbox 32*b*. In a non-rotary flight mode of aircraft 10, engine 26 operates as a turbofan or a turbojet engine to provide propulsion for aircraft 10. In other embodiments, aircraft 10 could have more than one engine such as a turboshaft engine that operates in the rotary flight mode of aircraft 10 and a turbofan or turbojet engine that operates in the non-rotary flight mode of aircraft 10.

FIG. 1A illustrates aircraft 10 in the VTOL or helicopter flight mode, in which proprotor systems 20*a*, 20*b* are rotating in a substantially horizontal plane to provide thrust-borne lift for aircraft 10, such that aircraft 10 flies much like a conventional helicopter. In VTOL flight mode, aircraft 10 is capable of vertical takeoff, hovering and vertical landing. In addition, using the gimballing degree of freedom of proprotor systems 20*a*, 20*b*, aircraft 10 is capable of relatively low-speed forward, aft and lateral directional movement. In the illustrated embodiment, hot combustion gases in engine 26 cause rotation of a power turbine coupled to an output shaft that is used to power the drive system of aircraft 10 and to provide torque and rotational energy to proprotor systems 20*a*, 20*b*.

FIG. 1B illustrates aircraft 10 in rotary forward flight mode, in which proprotor systems 20*a*, 20*b* are rotating in a substantially vertical plane to provide a forward thrust enabling wing 14 to provide wing-borne lift responsive to the forward airspeed, such that aircraft 10 flies much like a conventional propeller driven aircraft. In this configuration, the output shaft of engine 26 is used to power the drive system of aircraft 10 and to provide torque and rotational energy to proprotor systems 20*a*, 20*b*. Transitions between the VTOL flight mode and the rotary forward flight mode of aircraft 10 are achieved by changing the angular positions of pylon assemblies 18*a*, 18*b* between the generally vertical position and the generally horizontal position. Pylon assemblies 18*a*, 18*b* may be tilted between the vertical and horizontal positions using actuators (not shown) that are engaged in response to commands originating from the pilot, an onboard flight control computer 34 and/or other flight control systems.

In the rotary flight modes of aircraft 10, proprotor systems 20*a*, 20*b* rotate in opposite directions to provide torque balancing to aircraft 10. For example, when viewed from the front of aircraft 10 during rotary forward flight (FIG. 1B) or from above during VTOL flight (FIG. 1A), proprotor system 20*a* rotates clockwise, as indicated by motion arrows 36*a*, and proprotor system 20*b* rotates counterclockwise, as indicated by motion arrows 36*b*. In the illustrated embodiment, proprotor systems 20*a*, 20*b* each include three proprotor blades that are equally spaced apart circumferentially at approximately 120 degree intervals. It should be understood by those having ordinary skill in the art, however, that the proprotor systems of the present disclosure could have proprotor blades with other designs and other configurations including proprotor systems having four, five, six or more proprotor blades. In addition, it should be appreciated that aircraft 10 can be operated such that proprotor systems 20*a*, 20*b* are selectively positioned between the forward flight mode and the helicopter mode, which can be referred to as a conversion flight mode.

When it is desired to transition from rotary forward flight mode to non-rotary forward flight mode, engine 26 is transitioned from turboshaft mode to turbofan or turbojet mode to provide propulsive thrust for aircraft 10. In a turbofan embodiment, hot combustion gases in engine 26 cause rotation of a power turbine coupled to an output shaft that is used to power a turbofan that forces bypass air through a fan duct to create forward thrust enabling wing 14 to provide wing-borne lift responsive to the forward airspeed of aircraft 10. In a turbojet embodiment, the hot combustion gases exit engine 26 through an exhaust nozzle to produce a high-velocity exhaust stream to create forward thrust enabling wing 14 to provide wing-borne lift responsive to the forward airspeed of aircraft 10. In the non-rotary forward flight mode, using either a turbofan embodiment or a turbojet embodiment of engine 26, aircraft 10 flies much like a conventional jet aircraft.

Once engine 26 has transitioned out of turboshaft mode and is no longer providing torque and rotational energy to proprotor systems 20*a*, 20*b*, proprotor blade assemblies 22*a*, 22*b* are feathered to a streamlined orientation in the direction of flight, such that proprotor blade assemblies 22*a*, 22*b* function as brakes to aerodynamically stop the rotation of proprotor systems 20*a*, 20*b*. A braking system may also be used to slow and stop the rotation of proprotor systems 20*a*, 20*b* and/or to clock proprotor blade assemblies 22*a*, 22*b* to a desired angular orientation relative to pylon assemblies 18*a*, 18*b* (FIG. 1C). The gimbal lock systems having rotatable hub locks of the present disclosure may now be engaged to disable the gimballing degree of freedom of proprotor systems 20*a*, 20*b*. Alternatively, the gimbal lock systems of the present disclosure may be engaged during the wind down of proprotor systems 20*a*, 20*b* prior to fully stopping rotation. Proprotor blade assemblies 22*a*, 22*b* are then folded aftwardly such that proprotor blade assemblies 22*a* are received within a blade retention system 38*a* and proprotor blade assemblies 22*b* are received within a blade retention system 38*b* (FIG. 1D). This orientation minimizes the drag force generated by proprotor blade assemblies 22*a*, 22*b* during forward flight, and particularly during high-speed forward flight.

Figure 3E:
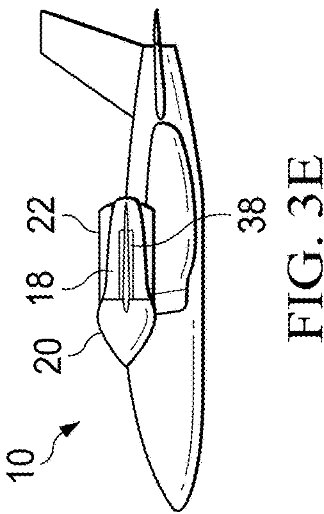
Figure 3F:
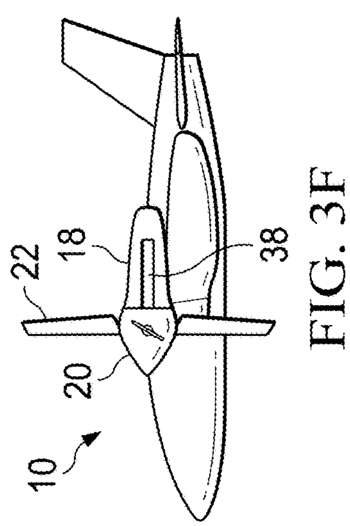
Figure 3G:
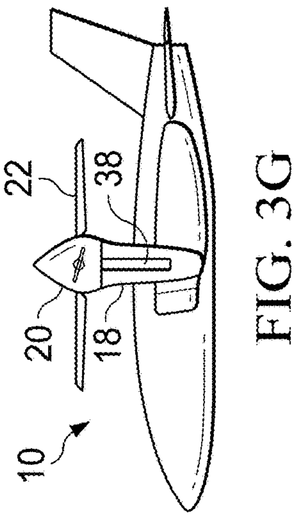

Referring additionally to FIGS. 3A-3H in the drawings, a sequential flight-operating scenario of aircraft 10 is depicted. As best seen in FIG. 3A, aircraft 10 is positioned on the ground prior to takeoff. When aircraft 10 is ready for a mission, flight control computer 34 commences operations to provide flight control to aircraft 10 which may be commanded by an onboard pilot, a remote flight control system, an onboard autonomous flight control system or a combination thereof. For example, it may be desirable to utilize onboard pilot flight control during certain maneuvers such as vertical takeoff and landing but rely on autonomous flight control during other maneuvers such as hover and transitions between thrust-borne lift and wing-borne lift.

As best seen in FIG. 3B, aircraft 10 has performed a vertical takeoff and is engaged in thrust-borne lift with proprotor systems 20 (collectively referring to proprotor systems 20*a*, 20*b*) rotating in substantially the same horizontal plane. In the VTOL orientation, collective proprotor blade pitch control is used to increase and decrease lift while cyclic proprotor blade pitch control and proprotor blade flapping is used to provide hover maneuverability. In the illustrated embodiment, each of proprotor systems 20 has a gimballing degree of freedom in which the respective hub assemblies of proprotor systems 20 gimbal relative to the respective masts of proprotor systems 20 during flapping while proprotor blade assemblies 22 (collectively referring to proprotor blade assemblies 22*a*, 22*b*) remain in a substantially fixed in-plane orientation relative to their respective hub assembly. A longitudinal axis 40*a* and a lateral axis 40*b* of aircraft 10 are both in the horizontal plane H such that aircraft 10 has a level flight attitude. During VTOL operations, flight control computer 34 may utilize changes in collective and/or cyclic proprotor blade pitch to control the flight dynamics of aircraft 10 including maintaining altitude stability and providing pitch, roll and yaw authority. In addition to vertical operations, aircraft 10 may perform relatively low-speed directional movement in the VTOL flight mode.

After vertical ascent to the desired elevation, aircraft 10 may begin the conversion from thrust-borne lift to wing-borne lift. This is achieved by changing the angular positions of pylon assemblies 18 (collectively referring to pylon assemblies 18*a*, 18*b*) via a pitch down maneuver from the generally vertical orientation in FIG. 3B to the generally horizontal orientation in FIG. 3C. During the conversion process, the vertical lift portion of the thrust generated by proprotor systems 20 progressively decreases as the forward thrust portion of the thrust generated by proprotor systems 20 progressively increases. This urges aircraft 10 to accelerate in the forward direction such that the forward airspeed of aircraft 10 increases allowing wing 14 to offload a portion and eventually all the lift requirement from proprotor systems 20. As best seen in FIG. 3C, pylon assemblies 18 have been collectively inclined about ninety degrees pitch down such that proprotor systems 20 are rotating in substantially the same vertical plane providing forward thrust for aircraft 10 while wing 14 provides wing-borne lift. During rotary forward flight, each of proprotor systems 20 has a gimballing degree of freedom. In all forward flight modes, pitch, roll and yaw authority may be provided by collective and/or differential operations of control surfaces such as ailerons, elevators, a rudder and the like.

When it is desired to transition from rotary forward flight to non-rotary forward flight, engine 26 transitions from turboshaft mode to turbofan or turbojet mode. Once engine 26 is disengaged from and no is longer providing torque and rotational energy to proprotor systems 20, proprotor blade assemblies 22 are feathered to slow and eventually stop the rotation of proprotor systems 20 and preferably to clock proprotor blade assemblies 22*a*, 22*b* to a desired angular orientation relative to pylon assemblies 18*a*, 18*b*. The gimballing degree of freedom of proprotor systems 20 is now disabled by engaging the gimbal lock systems having rotatable hub locks disclosed herein. Proprotor blade assemblies 22 may now be folded aftwardly, as best seen in FIG. 3D. Proprotor blade assemblies 22 are preferably captured within the receiving slots of blade retention systems 38 (collectively referring to blade retention systems 38*a*, 38*b*). The improved aerodynamics created by folding proprotor blade assemblies 22 relative to pylon assemblies 18 helps to enable the high-speed forward flight mode of aircraft 10, as best seen in FIG. 3D.

Figure 3H:
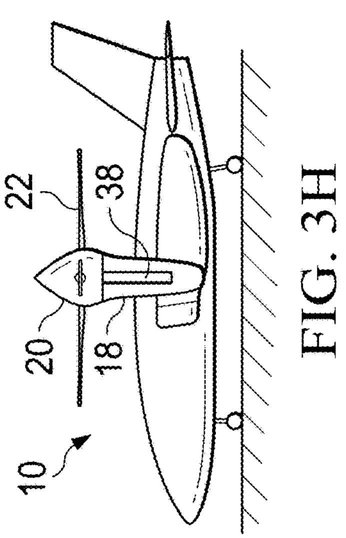

As aircraft 10 approaches its destination, aircraft 10 may begin its transition from wing-borne lift to thrust-borne lift. As best seen from the progression of FIGS. 3E-3F, proprotor blade assemblies 22 are unfolded, the gimbal lock systems having rotatable hub locks are disengaged to enable the gimballing degree of freedom of proprotor systems 20, and engine 26 transitions from turbofan or turbojet mode back to turboshaft mode to provide torque and rotational energy to proprotor systems 20, thereby returning aircraft 10 to the rotary forward flight mode. As best seen from the progression of FIGS. 3F-3G, pylon assemblies 18 perform a pitch up maneuver from the generally horizontal orientation to the generally vertical orientation during which the vertical lift portion of the thrust generated by proprotor systems 20 progressively increases as the forward thrust portion of the thrust generated by proprotor systems 20 progressively decreases until the entire lift requirement is supported by proprotor systems 20. As best seen in FIG. 3H, aircraft 10 has vertically landed at the destination location.

Figure 4A:
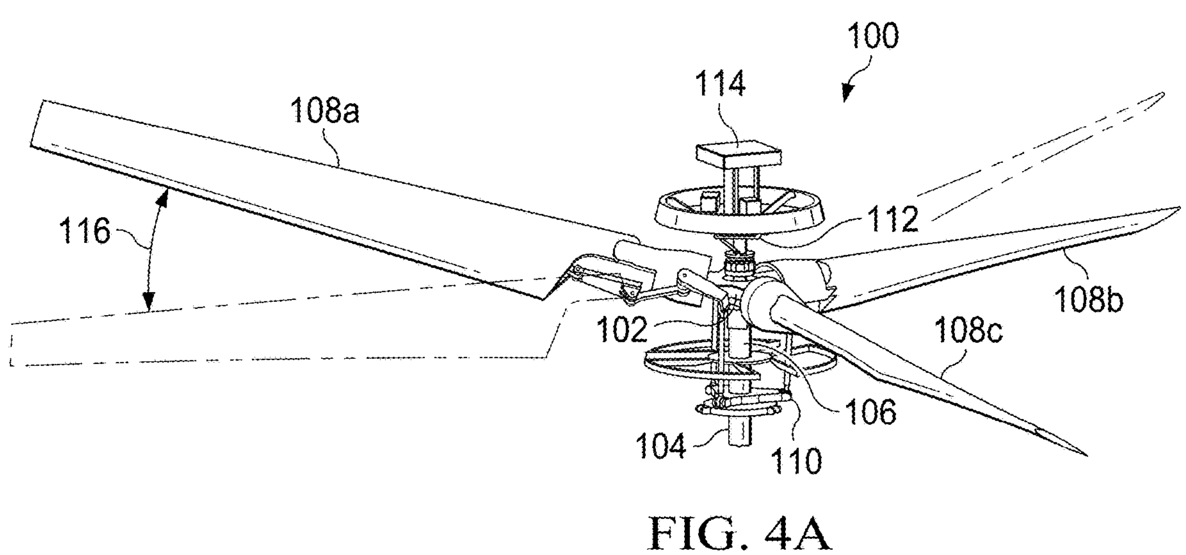
FIGS. 4A-4B are isometric views of a proprotor system for a high-speed tiltrotor aircraft having a gimbal lock system with a rotatable hub lock in disengaged and engaged positions in accordance with embodiments of the present disclosure.
Figure 4B:
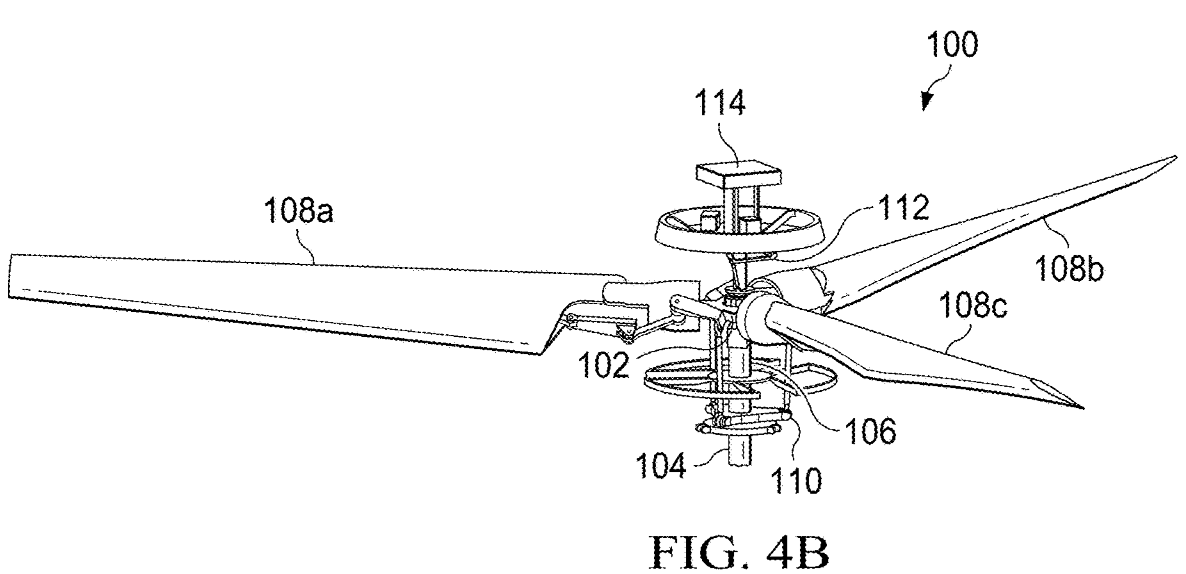

Referring next to FIGS. 4A-4B in the drawings, a proprotor system for a high-speed tiltrotor aircraft, such as aircraft 10, is depicted and generally designated 100. Proprotor system 100 is representative of and may be interchanged for proprotor systems 20*a*, 20*b* disclosed herein. In the illustrated embodiment, proprotor system 100 includes a hub assembly 102 that is coupled to and rotatable with a mast 104 which is coupled to the drive system of aircraft 10 including engine 26, main gearbox 28, one of driveshafts 30*a*, 30*b* and one of proprotor gearboxes 32*a*, 32*b*. Accordingly, the drive system provides torque and rotational energy to proprotor system 100. In the illustrated embodiment, hub assembly 102 is coupled to mast 104 via a gimbal assembly 106 that provides a gimballing degree of freedom for hub assembly 102 and thus proprotor system 100 which includes proprotor blades 108*a*, 108*b*, 108*c*. The collective pitch and the cyclic pitch of proprotor blades 108*a*, 108*b*, 108*c* are controlled by a pitch control system depicted as a swashplate assembly 110. In addition, proprotor system 100 includes a gimbal lock system 112 that selectively enables and disables the gimballing degree of freedom of hub assembly 102 and thus proprotor system 100. Gimbal lock system 112 includes a controller 114 that is in data communication with flight control computer 34 to control the operations of gimbal lock system 112.

The gimballing degree of freedom of hub assembly 102 relative to mast 104 is illustrated with arrow 116 and the phantom rotor blades of proprotor system 100 in FIG. 4A. The gimballing degree of freedom allows hub assembly 102 to vary its plane of rotation relative to mast 104 creating rotor tilting 116 which enables certain directional control of aircraft 10. For example, the plane of rotation of hub assembly 102 may be varied to provide forward, aft, left or right directional thrust for aircraft 10 in helicopter flight mode. The position of swashplate assembly 110 may be used to control the amplitude of rotor tilting 116 and may be managed manually by a pilot or using control laws implemented by flight control computer 34. In certain operational modes of aircraft 10 as discussed herein, it is desirable to prevent gimballing of proprotor system 100. In the illustrated embodiment, this is achieved using gimbal lock system 112 which is positioned about and rotatable with mast 104. Gimbal lock system 112 is actuatable between a disengaged position with hub assembly 102 (FIG. 4A) to enable the gimballing degree of freedom and an engaged position with the hub assembly 102 (FIG. 4B) to disable the gimballing degree of freedom. Gimbal lock system 112 moves between the disengaged position and the engaged position depending on the operational circumstances as discussed herein. In one scenario, gimbal lock system 112 is engaged to lock out the gimballing degree of freedom of hub assembly 102 during transitions from the rotary flight mode to the non-rotary mode of aircraft 10. For example, gimbal lock system 112 may be engaged when hub assembly 102 is being slowed or stopped prior to a blade folding operation as discussed herein. Conversely, gimbal lock system 112 may be disengaged after a blade unfolding operation in preparation for transitioning from the non-rotary flight mode back to the rotary flight mode of aircraft 10.

Figure 5A:
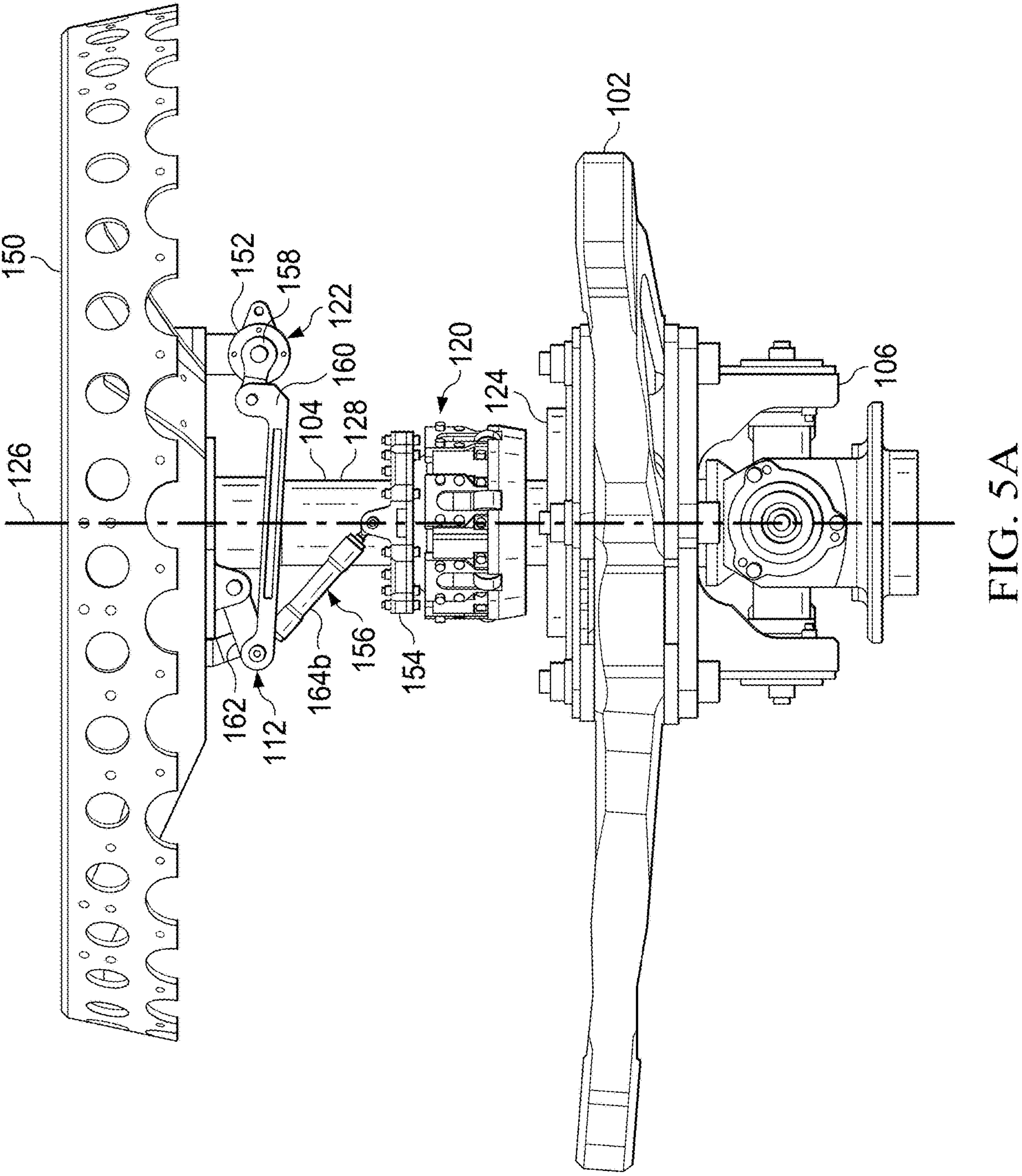
FIGS. 5A-5C are side views of a portion of a proprotor system for a high-speed tiltrotor aircraft having a gimbal lock system with a rotatable hub lock in disengaged, alignment and engaged positions in accordance with embodiments of the present disclosure.
Figure 5B:
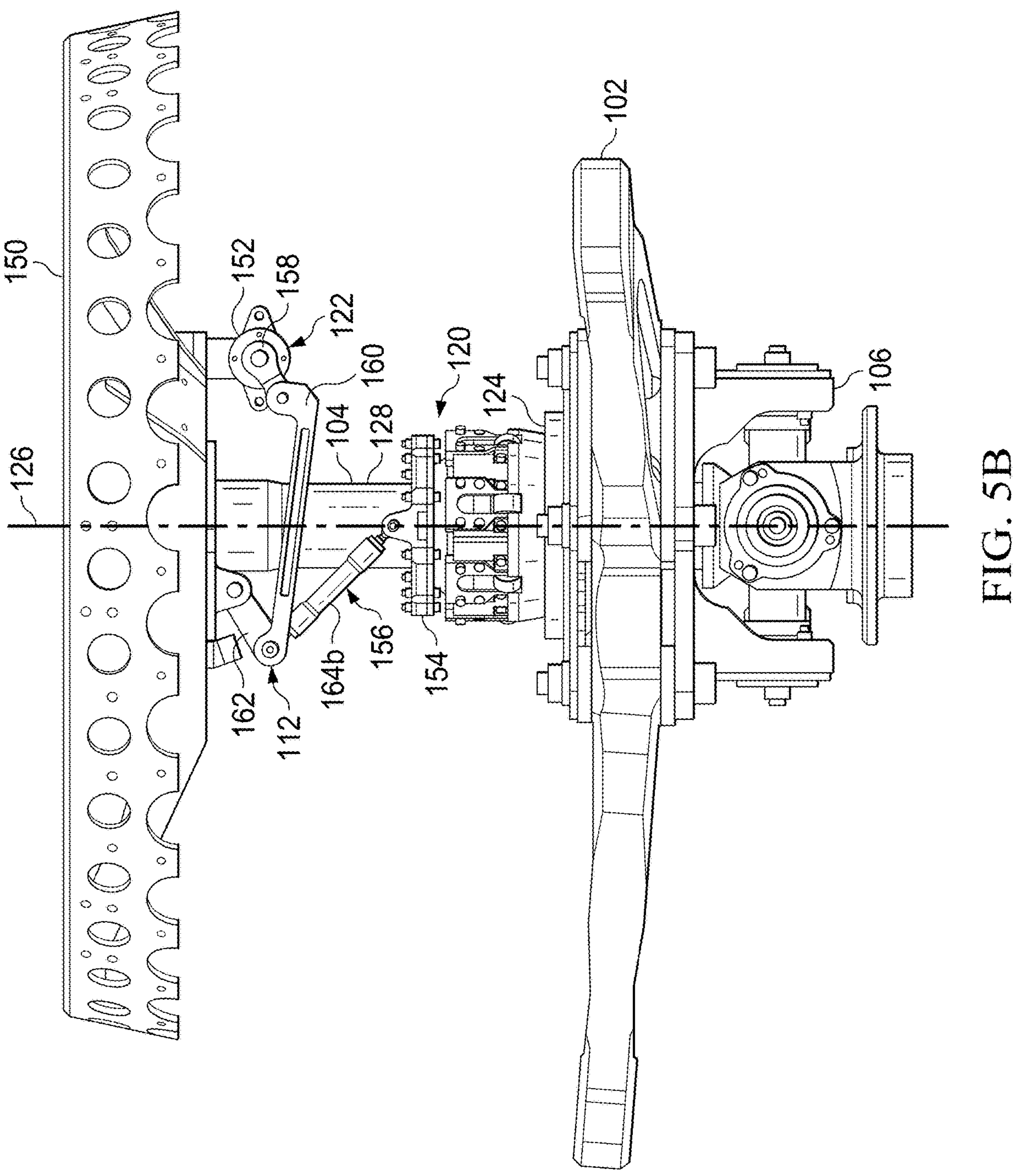
Figure 5C:
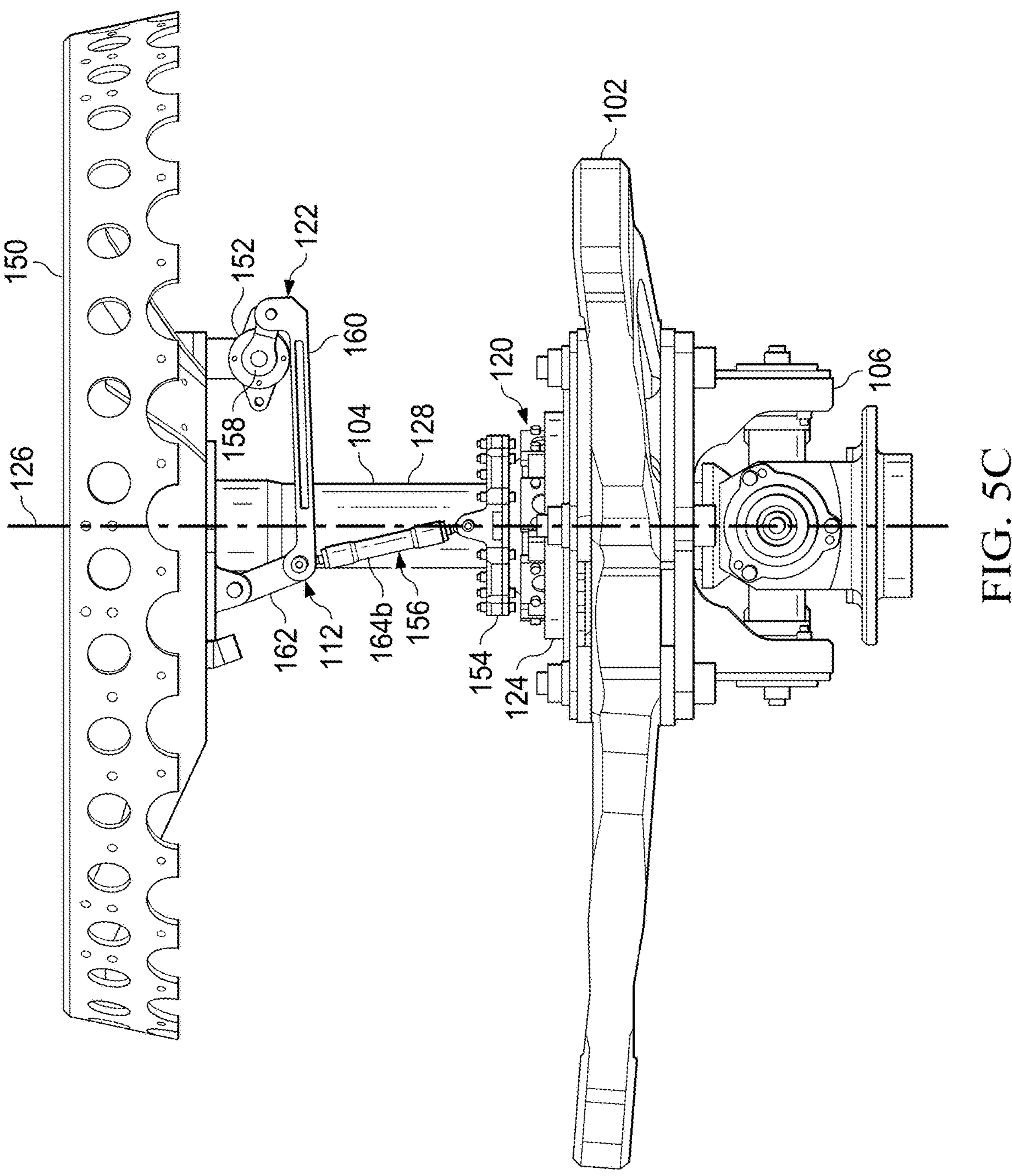
Figure 6A:
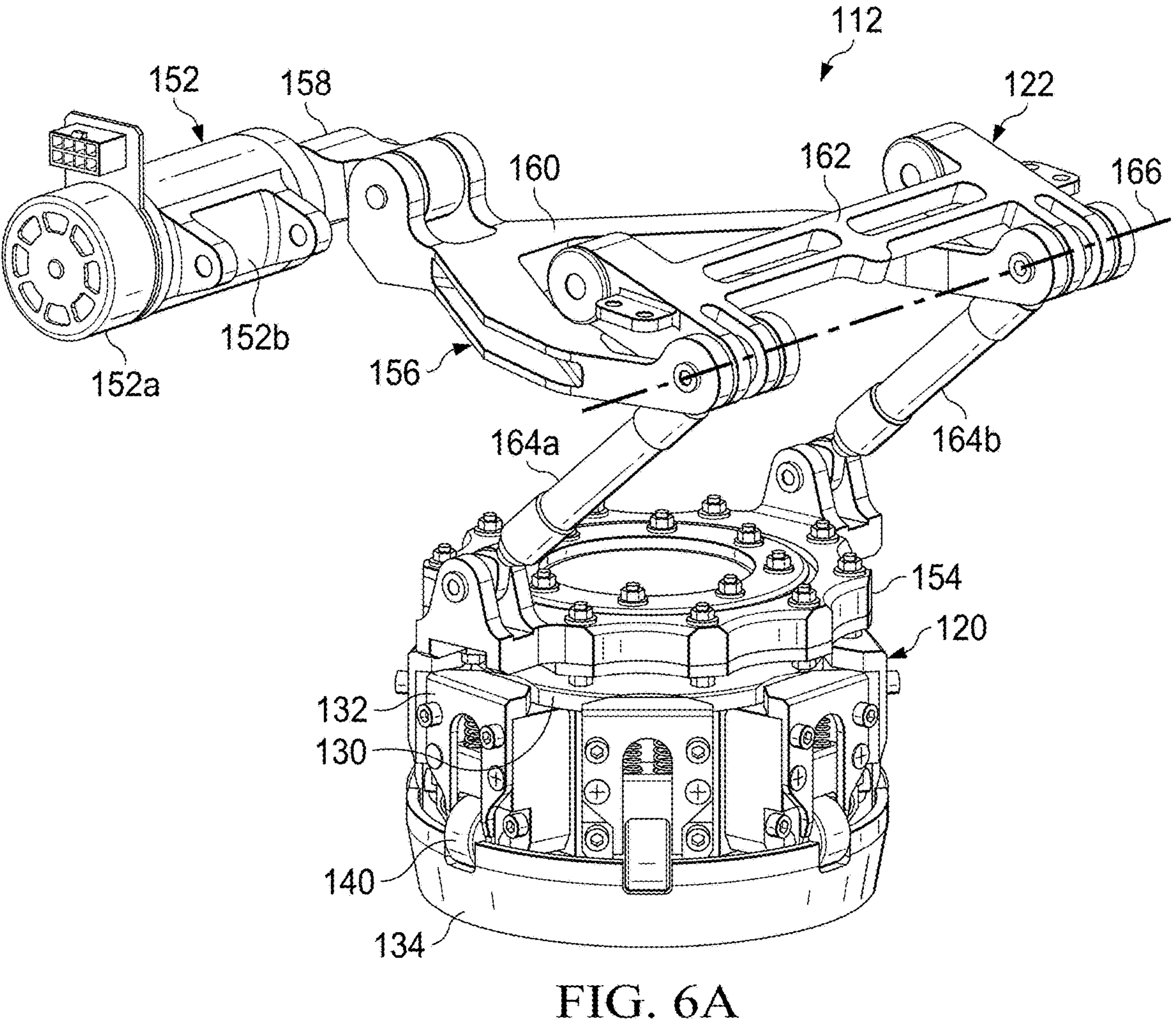
FIGS. 6A-6B are isometric views of a gimbal lock system with a rotatable hub lock in raised and lowered positions in accordance with embodiments of the present disclosure.
Figure 6B:
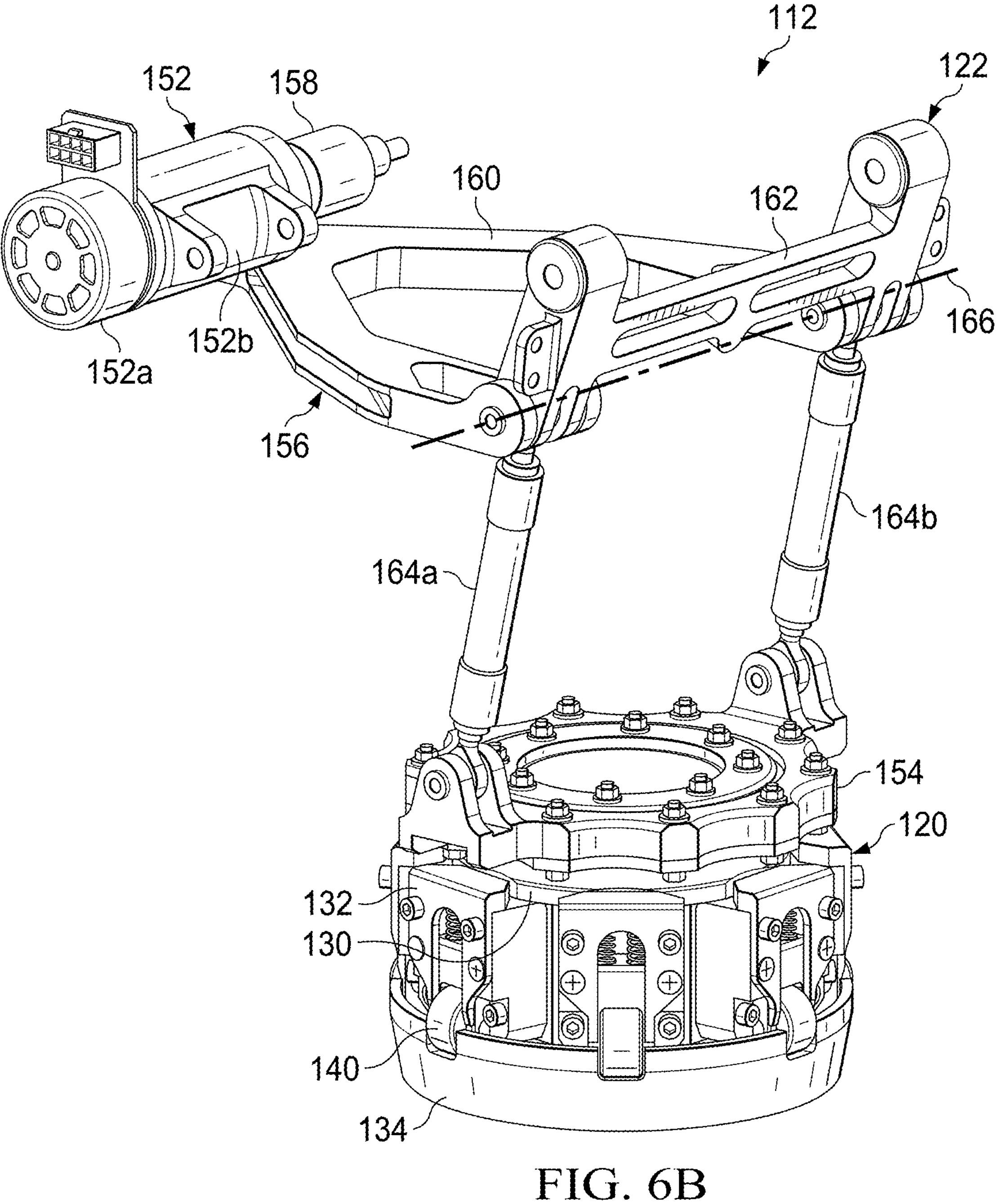

Referring additionally to FIGS. 5A-5C and 6A-6B in the drawings, details regarding gimbal lock system 112 will now be discussed. Gimbal lock system 112 operates to selectively allow and prevent the gimballing degree of freedom of hub assembly 102. In FIG. 5A, gimbal lock system 112 is in a raised position, disengaged from hub assembly 102. In FIG. 5B, gimbal lock system 112 has been partially actuated and is in an alignment position relative to hub assembly 102. In FIG. 5C, gimbal lock system 112 has been fully actuated and is in a lowered position, engaged with hub assembly 102. FIG. 6A corresponds with FIG. 5A depicting gimbal lock system 112 in the raised position. FIG. 6B corresponds with FIG. 5C depicting gimbal lock system 112 in the lowered position. Gimbal lock system 112 includes a hub lock 120, an actuation assembly 122 and a hub lock receptacle 124 which is coupled to hub assembly 102. In other embodiments, a hub lock receptacle may be integrally formed within hub assembly 102. Hub lock 120 translates up and down relative to mast 104 in the direction of an axis of rotation 126 of mast 104. In addition, hub lock 120 rotates relative to mast 104 and actuation assembly 122 about axis of rotation 126. In the illustrated embodiment, mast 104 is depicted as having a mast sleeve 128 positioned thereon that rotates with mast 104 and is configured to protect mast 104.

Figure 9B:
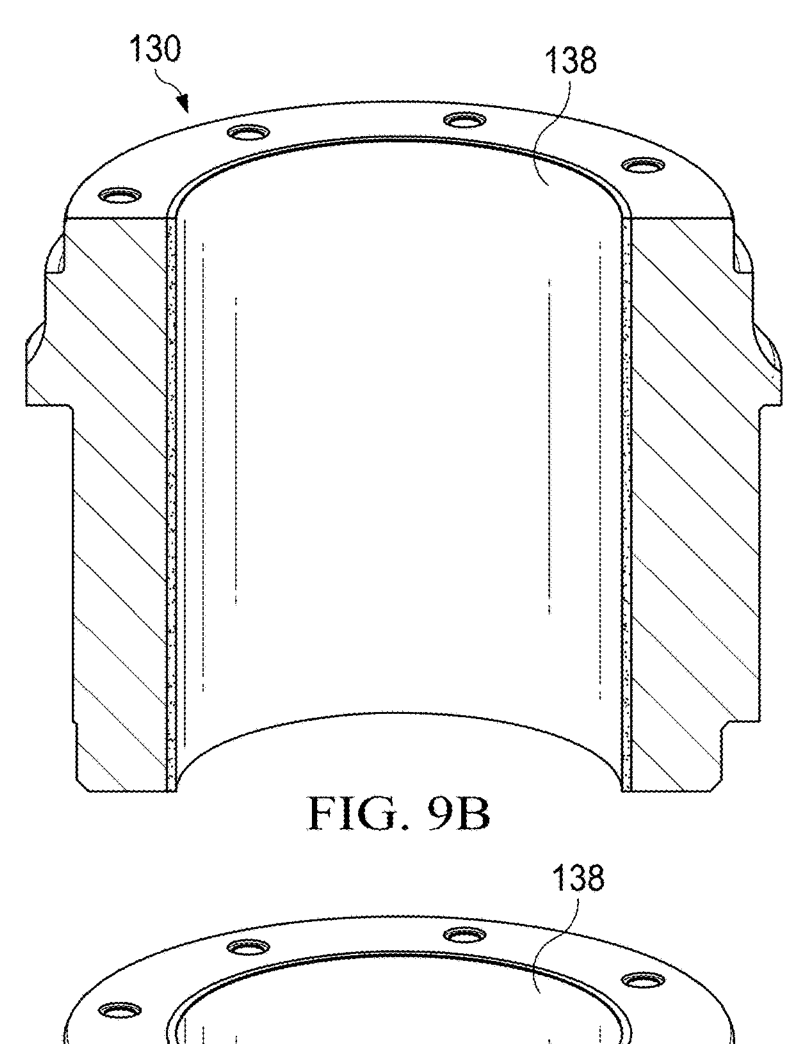
FIGS. 9A-9B are isometric and cross sectional views of a hub lock housing for a gimbal lock system with a rotatable hub lock in accordance with embodiments of the present disclosure.
Figure 9A:
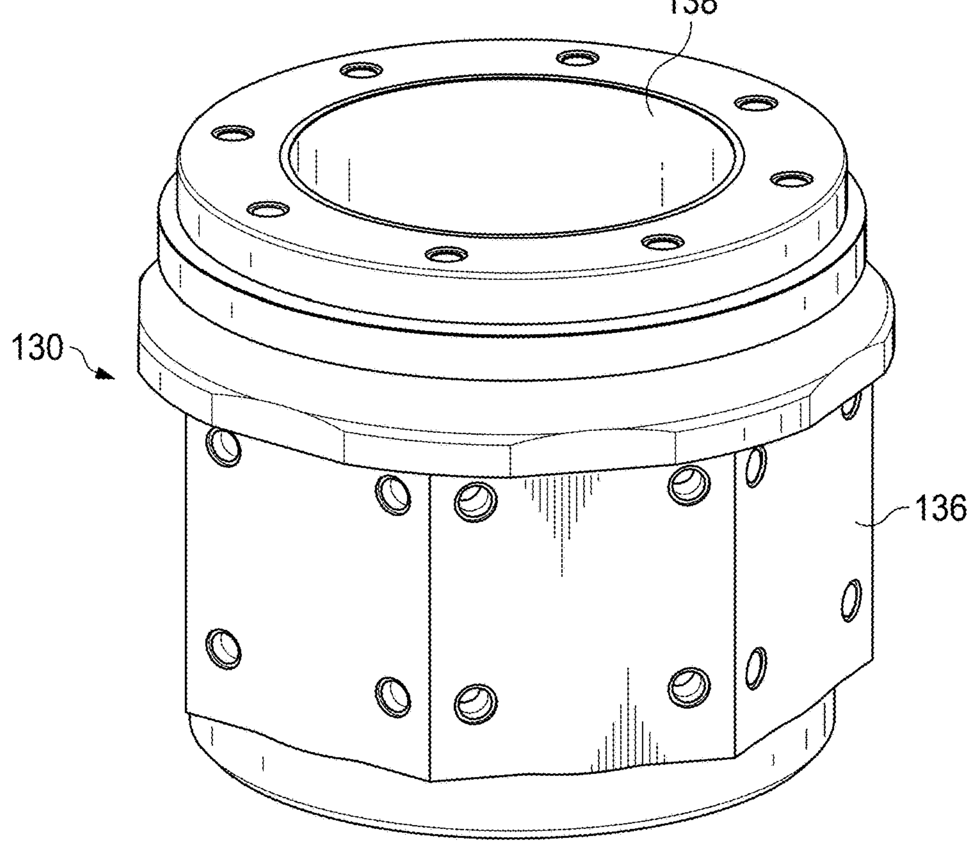

Hub lock 120 includes a hub lock housing 130, a plurality of roller cartridges 132 and a guide ring 134. Hub lock housing 130 is a generally cylindrical housing having a plurality of outer mounting surfaces 136 that are circumferentially distributed therearound (see also FIG. 9A). Hub lock housing 130 includes a low-friction liner 138 coupled to an inner surface thereof (see also FIG. 9B). Low-friction liner 138 creates a low-friction interface between hub lock 120 and mast sleeve 128 that is configured to enable low-friction relative translation and relative rotation between hub lock 120 and mast sleeve 128. For example, low-friction liner 138 may be a fluoropolymer liner such as a polytetrafluoroethylene liner. In other embodiments, mast sleeve 128 could have a low-friction outer surface to create or enhance the low-friction interface between hub lock 120 and mast sleeve 128.

Roller cartridges 132 are coupled to outer mounting surfaces 136 and are circumferentially distributed around hub lock housing 130. Each roller cartridge 132 includes a roller 140 that extends radially outwardly from the respective roller cartridge 132. In the illustrated embodiment, roller cartridges 132 are coupled to hub lock housing 130 with a plurality of screws. In other embodiments, roller cartridges 132 may be coupled to hub lock housing 130 in any suitable manner using other types of fasteners or other suitable mechanical connections. In still other embodiments, roller cartridges 132 may be integral with hub lock housing 130. While hub lock 120 is shown to include seven roller cartridges 132 that are uniformly distributed circumferentially about hub lock housing 130, it should be understood by those having ordinary skill in the art that a hub lock of the present disclosure could have any number of roller cartridges that are uniformly or nonuniformly distributed circumferentially thereabout. In the illustrated embodiment, rollers 140 are spring mounted within roller cartridges 132 and preferably have an outer surface that substantially matches the curvature of an interior surface 142 of hub lock receptacle 124 (see also FIG. 7). Guide ring 134 has a tapered outer surface 144 (see also FIG. 7) that together with the tapered inner surface 142 of hub lock receptacle 124 aids in hub lock receptacle 124 receiving and releasing hub lock 120. In addition, tapered surfaces 142, 144 helps to align hub lock 120 with hub assembly 102 by causing hub assembly 102 to tilt until it is oriented substantially normal to mast 104, as best seen in FIG. 5B.

A mounting plate 150, such as a spinner spoke or other structure, is coupled to and rotates with mast 104. Mounting plate 150 provides a structure for attaching actuation assembly 122 and a fixed reference for raising and lowering hub lock 120. Actuation assembly 122 includes a motor assembly 152 that is coupled to mounting plate 150. In the illustrated embodiment, motor assembly 152 includes an electric motor 152*a* and a gear reducer 152*b* that adjusts the output speed and torque of electric motor 152*a*. Actuation assembly 122 includes a lifting ring 154 that is coupled to hub lock housing 130. In addition, actuation assembly 122 includes a locking mechanism 156. In the illustrated embodiment, locking mechanism 156 includes a crank arm 158 that couples to the output of motor assembly 152, a forked idler 160 that couples to the output of crank arm 158, a pivot idler 162 that is coupled between mounting plate 150 and the outputs of forked idler 160 and a pair of links 164*a*, 164*b* that couple between the outputs of pivot idler 162 and lifting ring 154. It should be noted that the outputs of forked idler 160, the outputs of pivot idler 162 and the inputs of links 164*a*, 164*b* share a common axis 166 having a motion path that is dictated by pivot idler 162, the upper ends of which are coupled to mounting plate 150.

Actuation assembly 122 is used to operate hub lock 120 between raised and lowered positions which correspond to the disengaged and engaged positions, respectively, of gimbal lock system 112. When it is desired to operate hub lock 120 from the raised position to the lowered position, motor assembly 152 rotates crank arm 158 to retract forked idler 160 toward motor assembly 152. This motion causes pivot idler 162 to pivot relative to mounting plate 150 which causes links 164*a*, 164*b* to shift lifting ring 154 and thus hub lock 120 in a downward direction (compare FIG. 6A to FIG. 6B). This represents the locked position of locking mechanism 156 and the engaged position of gimbal lock system 112, as best seen in FIG. 5C. In the locked position of locking mechanism 156, pivot idler 162 and links 164*a*, 164*b* have an over-center configuration that secures locking mechanism 156 against unintended unlocking operations. When it is desired to operate hub lock 120 from the lowered position to the raised position, motor assembly 152 rotates crank arm 158 to extends forked idler 160 away from motor assembly 152. This motion causes pivot idler 162 to pivot relative to mounting plate 150 which causes links 164*a*, 164*b* to shift lifting ring 154 and thus hub lock 120 in an upward direction (compare FIG. 6B to FIG. 6A). This represents the open position of locking mechanism 156 and the disengaged position of gimbal lock system 112, as best seen in FIG. 5A.

Figure 7:
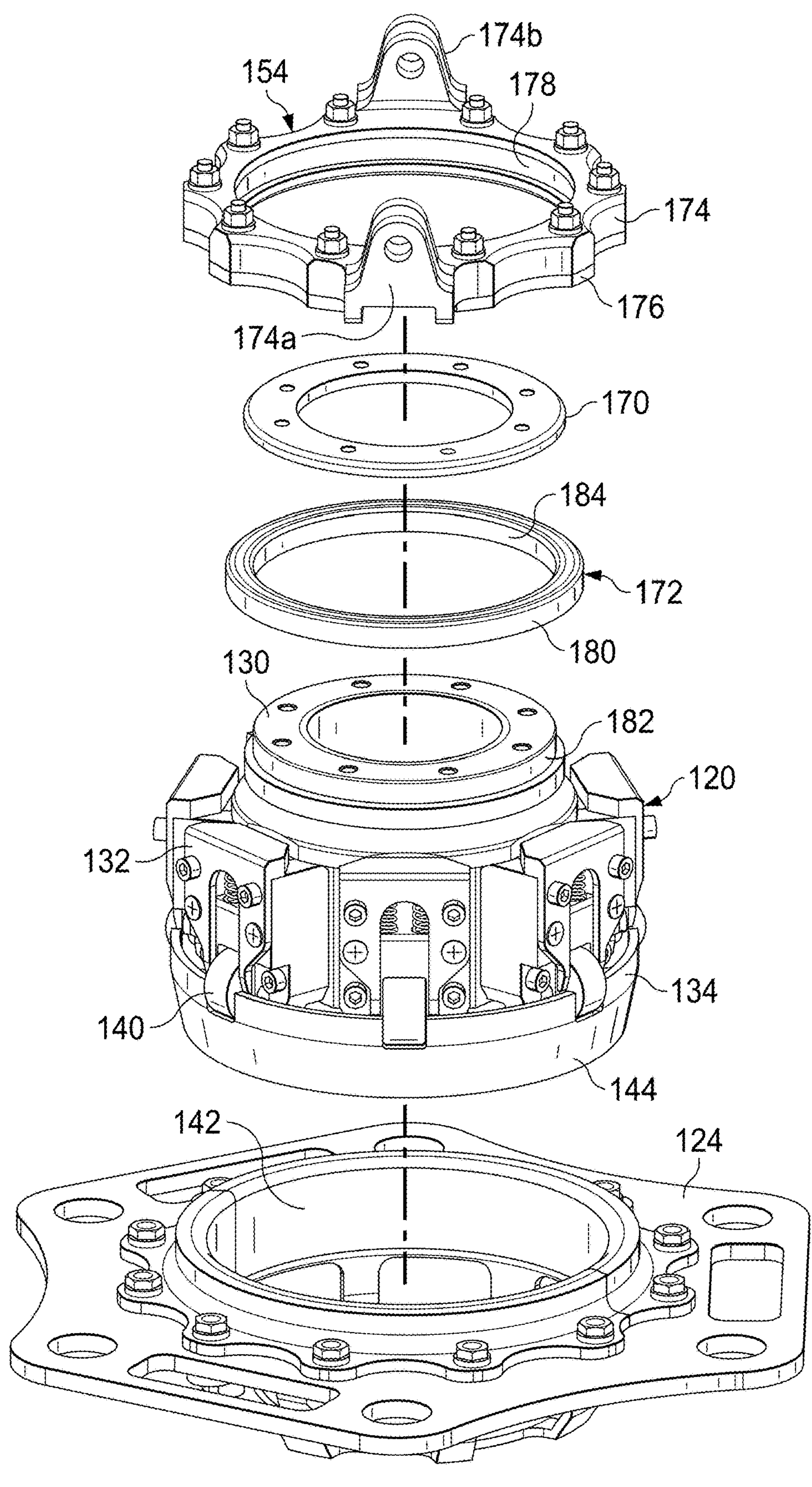
FIG. 7 is an exploded view of a gimbal lock system with a rotatable hub lock in accordance with embodiments of the present disclosure.
Figure 8A:
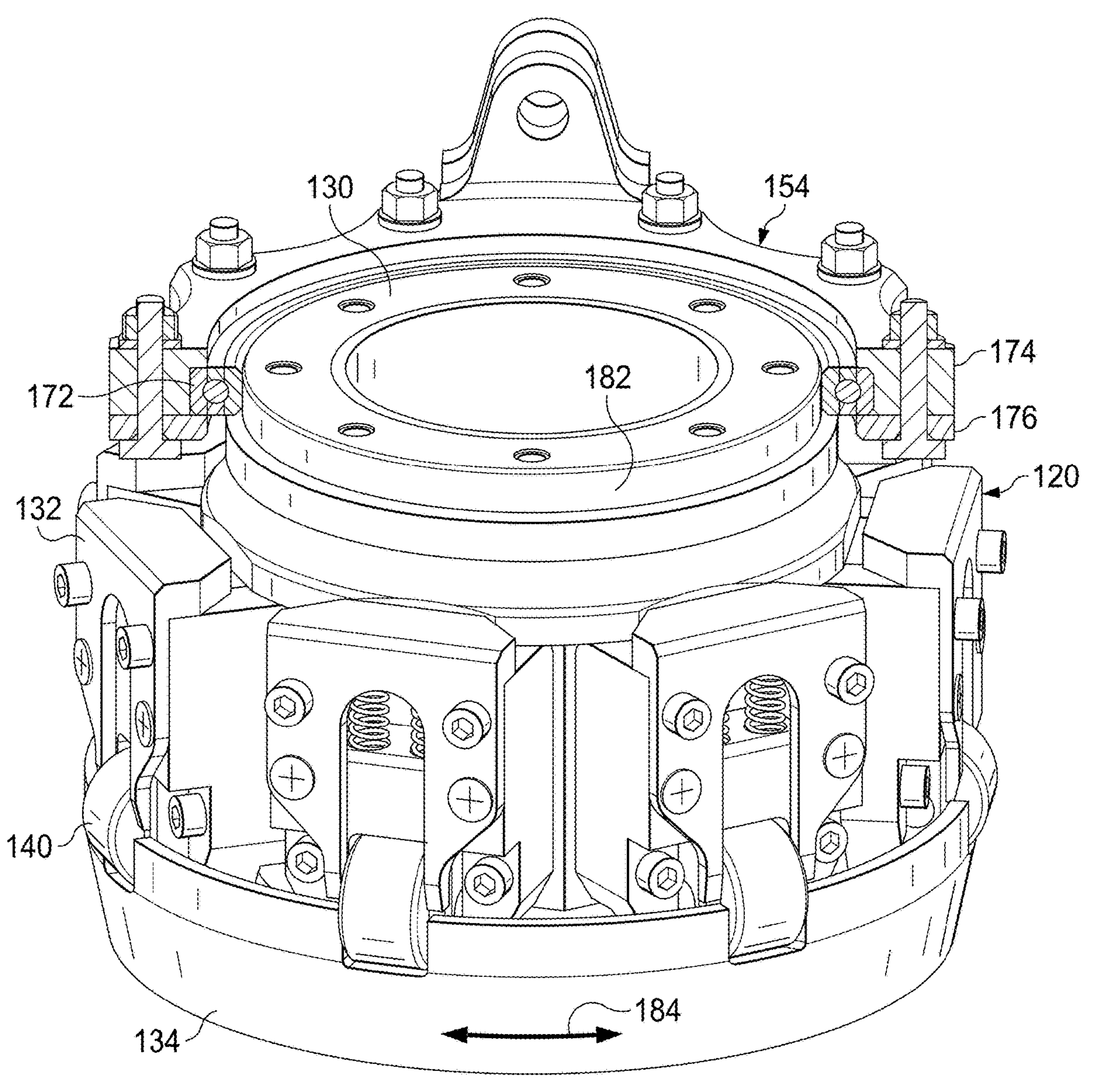
FIGS. 8A-8C are isometric views partially in cross section depicting a gimbal lock system with a rotatable hub lock in various positions in accordance with embodiments of the present disclosure.
Figure 8B:
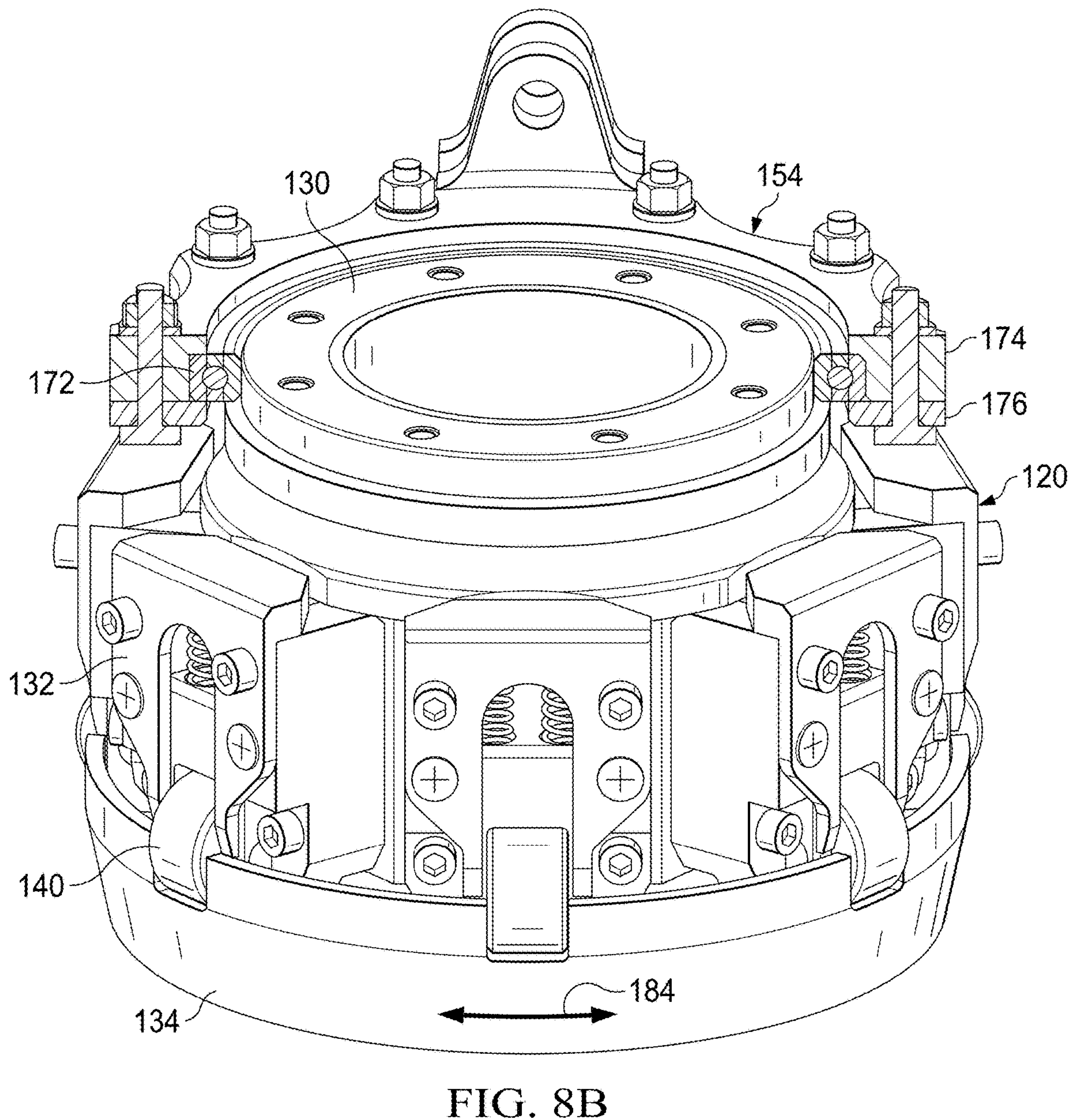
Figure 8C:
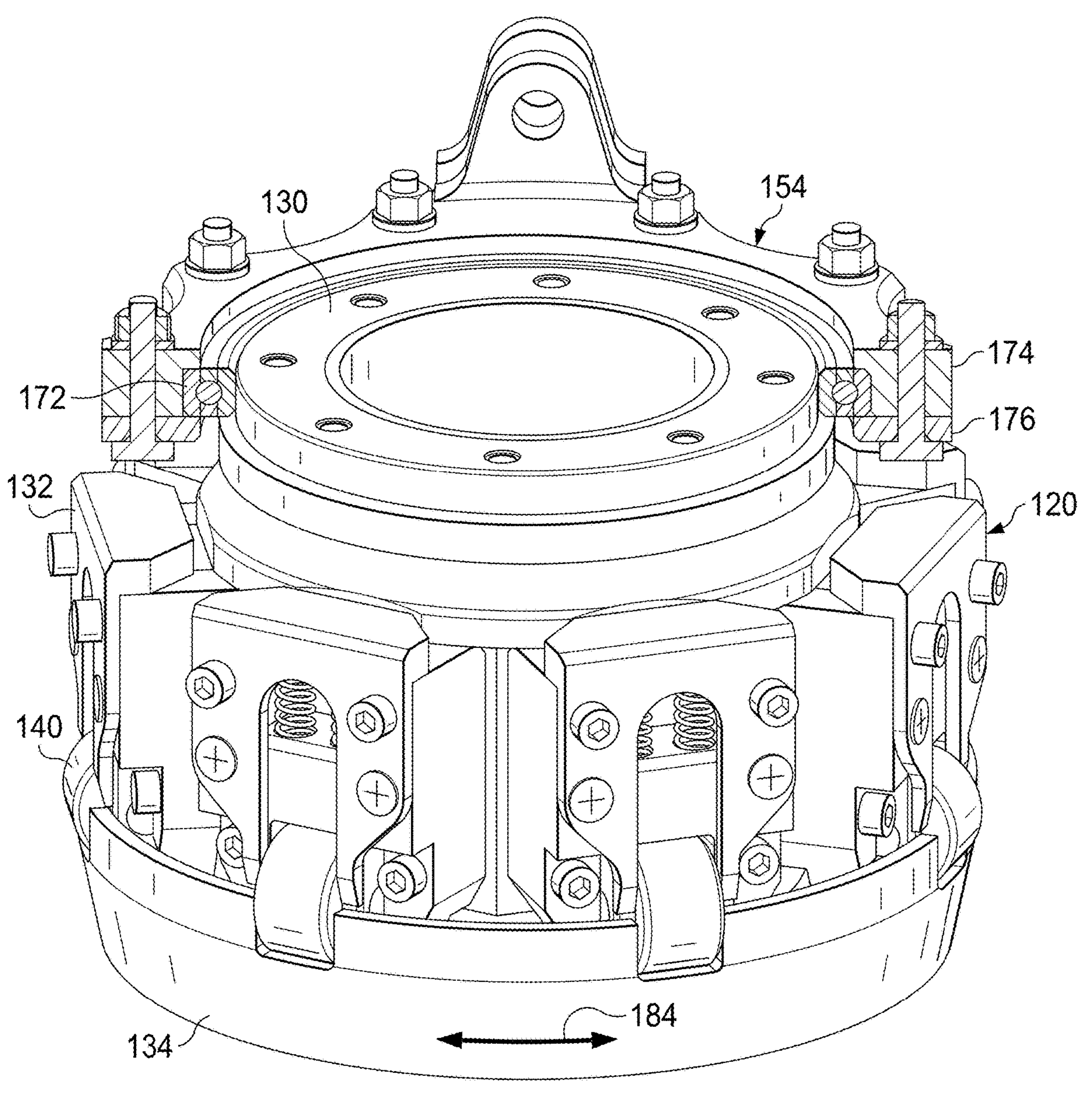

Referring now to FIGS. 7 and 8A-8C in the drawings, the rotating functionality of hub lock 120 will now be discussed. FIG. 7 depicts components of gimbal lock system 112 in an explode view. The illustrated portion of gimbal lock system 112 includes lifting ring 154, a bearing cap 170, a ball bearing assembly 172, hub lock 120 and hub lock receptacle 124. Lifting ring 154 includes an upper ring 174 having lugs 174*a*, 176*b* that receive lower ends of links 164*a*, 164*b* and a lower ring 176. Upper ring 174 and lower ring 176 include matching hole patterns such that upper ring 174 and lower ring 176 may be coupled together with a plurality of bolts. When fully assembled, upper ring 174 and lower ring 176 form a bearing groove 178 that receives and secures an outer race 180 of ball bearing assembly 172 therein. Bearing cap 170 and hub lock housing 130 include matching hole patterns such that bearing cap 170 and hub lock housing 130 may be coupled together with a plurality of bolts (see also FIG. 6A). When fully assembled, bearing cap 170 and hub lock housing 130 form a bearing groove 182 that receives and secures an inner race 184 of ball bearing assembly 172 therein. In this manner, ball bearing assembly 172 forms a revolute joint between hub lock 120 and lifting ring 154 such that hub lock 120 is rotatable relative to lifting ring 154 and thus to actuation assembly 156. The rotation of hub lock 120 relative to lifting ring 154 is indicated by arrow 186 and is best seen in the comparison of FIGS. 8A-8C. In this matter, hub lock 120 has a rotating degree of freedom about axis of rotation 126 relative to actuation assembly 122, mast 104, hub lock receptacle 124, hub assembly 102 and proprotor system 100. Even though ball bearing assembly 172 is depicted as creating the revolute joint between hub lock 120 and lifting ring 154, it should be understood by those having ordinary skill in the art that other types of revolute joints could be positioned between hub lock 120 and lifting ring 154 including, but not limited to, bushings, plain bearings, roller bearings, low friction coatings such as a fluoropolymer liner, a polytetrafluoroethylene liner or other suitable low-friction interface.

The rotatable hub locks of the present disclosure not only allow the gimbal lock system to enable and disable the gimballing degree of freedom of a proprotor system but also provide for stress relief within the gimbal lock system and particularly within the actuation assembly and component parts thereof. Specifically, when the gimbal lock system is in the engaged position with the hub assembly, torque between the mounting plate and a conventional non-rotatable hub lock must be resisted or restrained by the actuation assembly or component parts thereof. While these components are well-suited for handling axial loads, such as tensile and compressive loads, they may not perform as effectively under torsional or twisting loads. The rotatable hub locks of the present disclosure serve to eliminate torsional forces, thereby enhancing the overall durability and reliability of the gimbal lock systems of the present disclosure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

The invention claimed is:

1. A propulsion system for a rotorcraft comprising:

a mast having an axis of rotation;

a hub assembly coupled to and rotatable with the mast, the hub assembly having a gimballing degree of freedom relative to the mast; and a gimbal lock system positioned about and rotatable with the mast, the gimbal lock system including a hub lock and an actuation assembly that is operably coupled to the hub lock;

wherein, the hub lock is translatable relative to the mast between a disengaged position with the hub assembly to enable the gimballing degree of freedom and an engaged position with the hub assembly to disable the gimballing degree of freedom; and wherein, the hub lock is rotatable about the axis of rotation relative to the mast and the actuation assembly.

2. The propulsion system as recited in claim 1, wherein the hub assembly further comprises a hub lock receptacle having an inner surface configured to receive the hub lock.

3. The propulsion system as recited in claim 2, wherein the inner surface of the hub lock receptacle is a tapering inner surface configured to receive and release the hub lock.

4. The propulsion system as recited in claim 2, wherein the hub lock includes a leading guide having a tapering outer surface configured to align the hub lock with the hub lock receptacle.

5. The propulsion system as recited in claim 2, wherein the hub lock further comprises a plurality of radially outwardly extending and circumferentially distributed rollers configured to contact the inner surface of the hub lock receptacle to disable the gimballing degree of freedom.

6. The propulsion system as recited in claim 5, wherein each of the rollers is housed within a roller cartridge.

7. The propulsion system as recited in claim 1, wherein the gimbal lock system further comprises a revolute joint positioned between the hub lock and the actuation assembly, the revolute joint configured to enable relative rotation between the hub lock and the actuation assembly.

8. The propulsion system as recited in claim 7, wherein the revolute joint further comprises a low-friction interface between the hub lock and the actuation assembly.

9. The propulsion system as recited in claim 7, wherein the revolute joint further comprises a bearing assembly.

10. The propulsion system as recited in claim 7, wherein the revolute joint further comprises a ball bearing assembly.

11. The propulsion system as recited in claim 1, further comprising a mast sleeve positioned between the mast and the hub lock; and a low-friction interface positioned between the mast sleeve and the hub lock, the low-friction interface configured to enable relative translation and relative rotation between the hub lock and the mast sleeve.

12. The propulsion system as recited in claim 11, wherein the low-friction interface further comprises a low-friction liner coupled to an inner surface of the hub lock.

13. The propulsion system as recited in claim 11, wherein the low-friction interface further comprises a fluoropolymer liner coupled to an inner surface the hub lock.

14. The propulsion system as recited in claim 11, wherein the low-friction interface further comprises a polytetrafluoroethylene liner coupled to an inner surface the hub lock.

15. The propulsion system as recited in claim 1, wherein the actuation assembly further comprises:

a lifting ring coupled to the hub lock;

an over-center locking mechanism coupled to the lifting ring, the over-center locking mechanism having an open position and a locked position; and a motor operably coupled to the over-center locking mechanism and configured to operate the over-center locking mechanism between the open position and the locked position.

16. The propulsion system as recited in claim 15, wherein the open position of the over-center locking mechanism corresponds with the disengaged position of the hub lock; and wherein, the locked position of the over-center locking mechanism corresponds with the engaged position of the hub lock.

17. A tiltrotor aircraft comprising:

a fuselage;

a wing coupled to the fuselage;

a pylon assembly tiltably coupled to the wing;

a mast rotatable relative to the pylon assembly about an axis of rotation;

a hub assembly coupled to and rotatable with the mast, the hub assembly having a gimballing degree of freedom relative to the mast; and a gimbal lock system positioned about and rotatable with the mast, the gimbal lock system including a hub lock and an actuation assembly that is operably coupled to the hub lock;

wherein, the hub lock is translatable relative to the mast between a disengaged position with the hub assembly to enable the gimballing degree of freedom and an engaged position with the hub assembly to disable the gimballing degree of freedom; and wherein, the hub lock is rotatable about the axis of rotation relative to the mast and the actuation assembly.

18. The tiltrotor aircraft as recited in claim 17, wherein the tiltrotor aircraft is operable to transition between a rotary flight mode and a non-rotary flight mode;

wherein, the hub lock is in the engaged position in the non-rotary flight mode to stabilize the hub assembly; and wherein, the hub lock is in the disengaged position in the rotary flight mode to permit flapping of the hub assembly.

19. The tiltrotor aircraft as recited in claim 17, wherein the tiltrotor aircraft has a vertical takeoff and landing flight mode; and wherein, the hub lock is in the disengaged position in the vertical takeoff and landing flight mode to permit flapping of the hub assembly.

20. The tiltrotor aircraft as recited in claim 17, wherein the tiltrotor aircraft is a high-speed vertical takeoff and landing aircraft.

* * * * *